Figure 1:
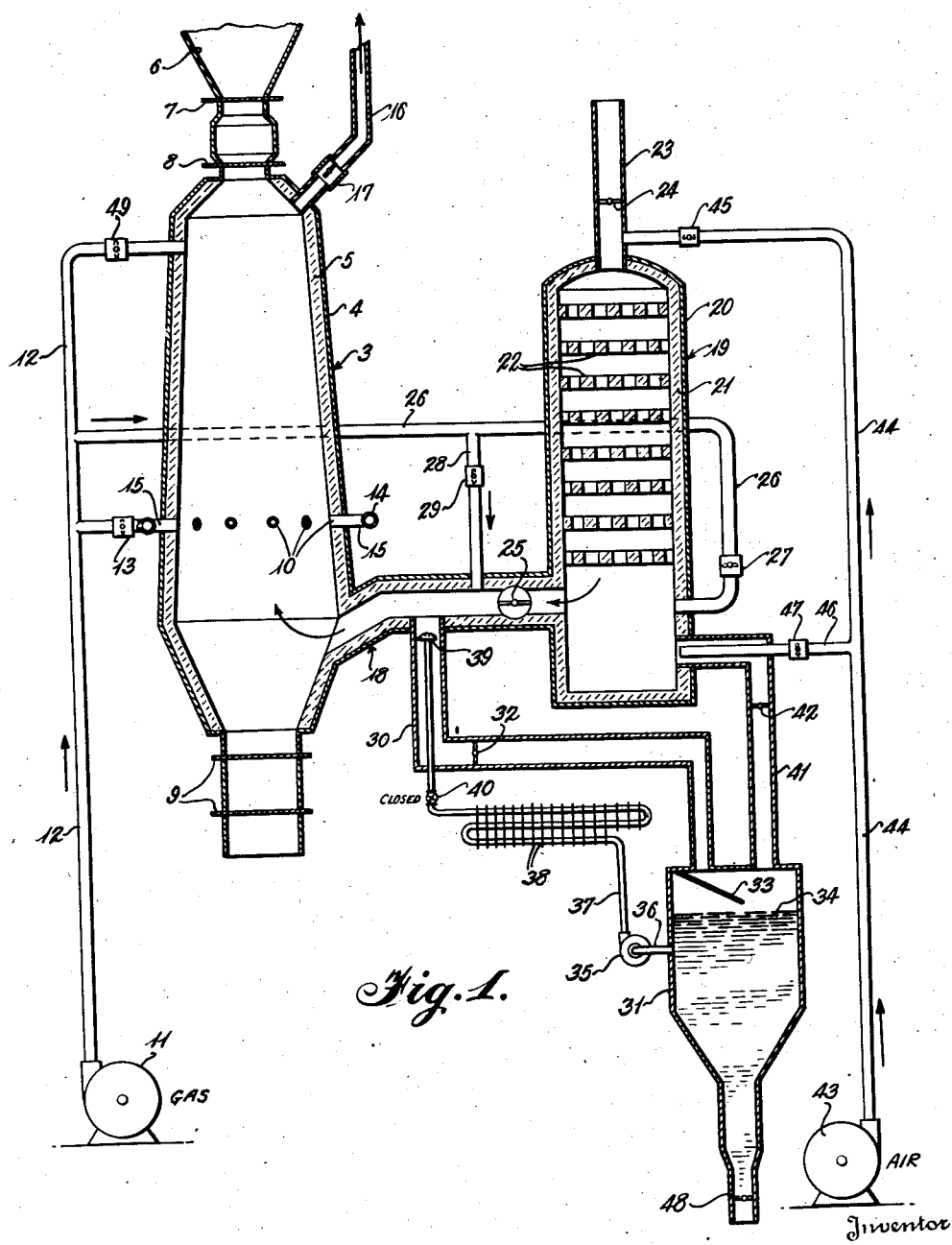

Dec. 12, 1944.  E. S. MERRIAM  2,364,742
REDUCTION OF METAL ORES
Filed April 29, 1942  2 Sheets-Sheet 1

Inventor
Edmund S. Merriam
By James P. Burns
Attorney

Patented Dec. 12, 1944

2,364,742

UNITED STATES PATENT OFFICE 2,364,742

REDUCTION OF METAL ORES

Edmund S. Merriam, Marietta, Ohio, assignor to Marietta Manufacturing Company, Point Pleasant, W. Va., a corporation of West Virginia Application April 29, 1942, Serial No. 441,008

6 Claims. (Cl. 75—67)

This invention relates generally to the recovery of metals by reduction of their oxides or carbonates. More particularly the invention relates to a process for reducing an oxide of a metal which is vapor at the temperature of reduction. Among the most important of such metals are magnesium and zinc.

Aside from electrolytic processes, the most commonly used method for reducing metals from their ores is reduction of the metal oxide by carbon. The metal oxides are among the more stable compounds and the reaction of reduction is endothermic. High temperatures are required in order that the reduction may proceed at practicable rates and, consequently, an extraneous supply of heat is required.

Certain metal oxides are readily reduced at comparatively low temperatures. For example, in an iron blast furnace coke is mixed with iron oxide and various fluxes and the coke is burned by application of moderately preheated air. In burning, the coke produces an atmosphere very high in carbon monoxide, which is the active reducing agent. The solid spongy iron first formed picks up carbon and the resulting crude product readily fuses and collects in the bottom of the furnace. The operation of the iron blast furnace is continuous and unidirectional, owing to the easy reducibility of the oxide and to the removal by fusion of the product out of the way of the incoming blast. However, zinc and magnesium are much more difficult to reduce and at their reduction temperatures are vapors. These vapors are very reactive and reoxidize readily.

Magnesium oxide can be reduced by solid carbon at temperatures of 2000° C. and above. The reduction is highly endothermic and it can proceed only by a continuous input of heat energy which is customarily done by using the heat of the electric arc. Even at temperatures below 2000° C. magnesium vapor will reoxidize in an atmosphere of carbon monoxide. To prevent this reoxidation, methods have been developed for sudden cooling of the vapor and gases. In the so-called Hansgirg process, the cooling is effected by large volumes of hydrogen or natural gas and it is understood that the United States Bureau of Mines has developed a cooling system involving a spray of oil which apparently is less hazardous than gas. Zinc vapor will not reoxidize so readily at the temperature of reduction of zinc oxide. The usual method for reduction of zinc oxide is to mix it with solid carbon and place the mixture in a retort which is strongly heated from an external source. A mixture of zinc vapor and carbon monoxide is evolved from which the zinc condenses.

Reduction of any solid oxide by solid carbon is dependent primarly on the temperature, although the rate at which the reaction proceeds appears to be due to other factors. Since contact of the two solids is a prerequisite, it is evident that fine grinding and intimate mixture will favor speed of reduction. Application of a reducing gas to small pieces of a solid metal oxide might be expected to give conditions of even closer contact and the actual speed of reduction might then be dependent upon rates of diffusion and velocities of gaseous bodies through the solids. Two gaseous reducing agents immediately suggesting themselves are carbon monoxide and hydrogen but these gases are quite incapable of reducing magnesium oxide even at temperatures much above 2000° C. However, the situation is quite different when methane is used as the reducing agent. Reduction of magnesium oxide with methane is appreciable at 1600° C. and is nearly complete at 2000° C. This reaction apparently occurs according to the following equation:

$$MgO + CH_4 = Mg + CO + 2H_2$$

At high temperatures, however, methane will thermally decompose into carbon and hydrogen, which are relatively ineffective, and it is consequently necessary to apply the methane gas to the heated solid in an abrupt manner to prevent decomposition of the methane prior to completion of the above reaction. In the case of zinc oxide, the reduction takes place at lower temperatures and thermal decomposition of the methane is not a problem.

According to the present invention an oxide of a metal which is a vapor at the reduction temperature is admixed with a solid carbonaceous material, such as coke, and the admixture is introduced into a reaction zone. A blast of intensely preheated air is passed through the admixture in the reaction zone until sufficient of the carbonaceous material is burned to raise the temperature of the admixture above the reduction temperature of the metal oxide. The air blast is then discontinued and methane or natural gas (which is largely methane) is introduced into the admixture. The methane is preferably introduced as a blast to the admixture and in passing therethrough it effects reduction of the metal oxide and separation of the metal vapor from the admixture. The metal vapor is then condensed and separated from the gases issuing from the reaction zone. The reduction reaction is endothermic and, consequently, the temperature of the admixture will gradually drop during the introduction of the methane until a temperature is reached at which substantial reduction of the metal oxide ceases. The methane blast is then discontinued and the temperature of the admixture is again raised by introduction of the heated air blast and burning of more carbonaceous material. It will thus be seen that the invention relates to an intermittent or cyclic process for the reduction of metal oxide.

During the introduction of the heated air blast, which period I shall hereinafter refer to as the "blast" period, only a small fraction of the admixed carbonaceous material is burned. During the introduction of methane to the admixture, which period I shall hereinafter refer to as the "make" period a small fraction only of the metal oxide is reduced. Provision is made for repeating these two periods and for withdrawing and replacing the admixture of metal oxide and carbonaceous material at appropriate intervals.

A primary object of the invention is to provide a process for reducing the oxides of metals such as magnesium and zinc, which are vapors at the reduction temperature of their oxides, by the use of natural gas or methane and carbonaceous material such as coke to thereby eliminate the present necessity for the use of electrical energy or other forms of energy or fuel which are more expensive.

Another important object of the invention is to provide a process for reducing the cost of reduction of metal oxides. Metal oxides such as those with which the present invention is concerned, are found in many geographic regions where natural gas is available in large quantities at low cost.

Other objects and advantages of the invention will be specifically referred to hereinafter or will be obvious from the following description. For a better understanding of the invention, I have attached drawings illustrating a suitable apparatus for carrying out my invention. In these drawings.

Figure 2:
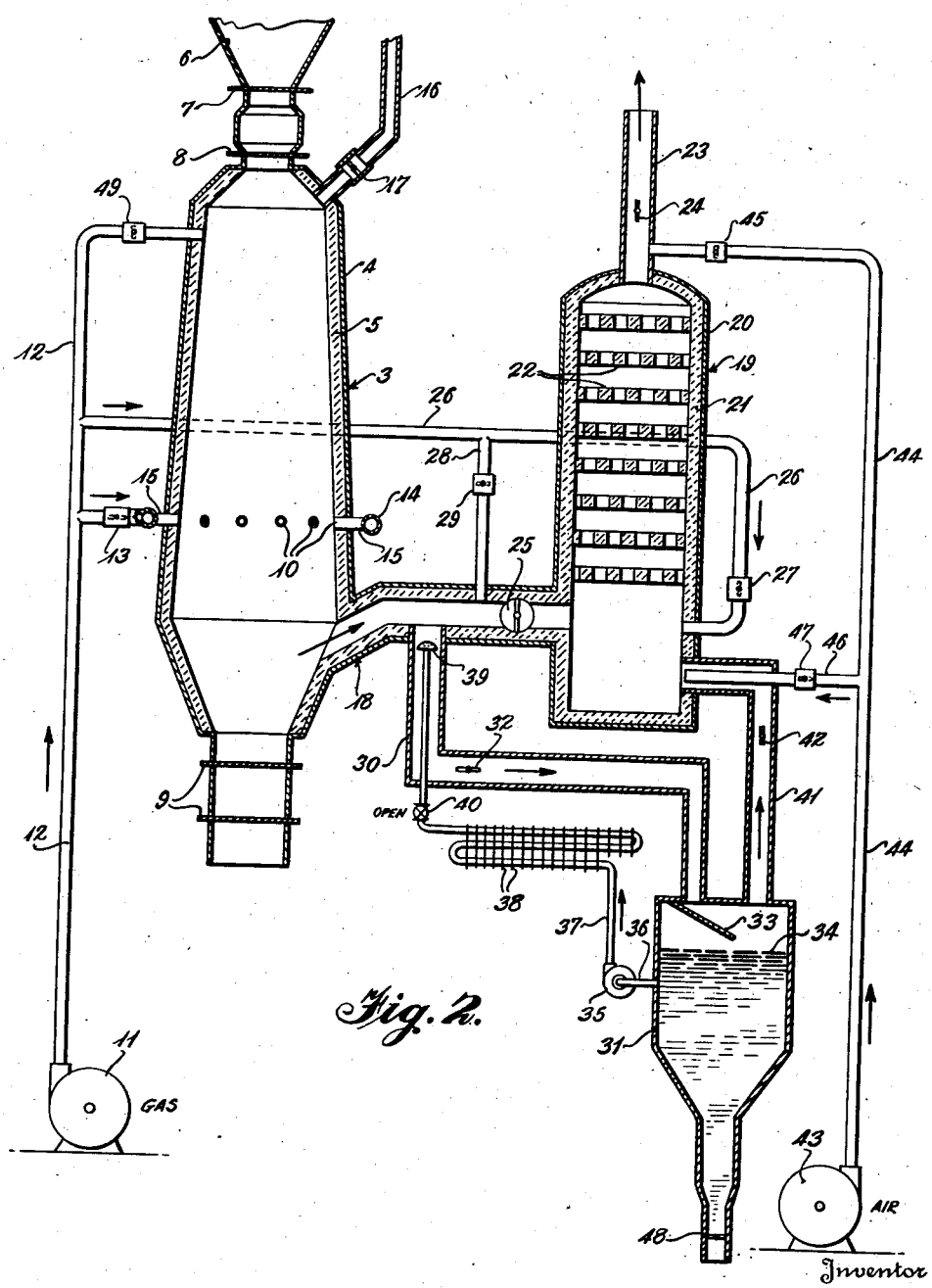

Figure 1 is a somewhat diagrammatic view of the apparatus during the "blast" period, that is during the period in which a heated blast of air is being supplied to the reaction zone, and Fig. 2 is a similar view of the apparatus during the "make" period, that is while natural gas or methane is being supplied to the reaction zone to effect reduction of the metal oxide.

The reaction zone is shown in the form of a shaft furnace designated generally by the reference numeral 3. The furnace 3 is provided with a steel shell 4 and an insulating lining 5 of refractory brick such as zirconia brick. Portions of the shaft furnace subjected to higher temperatures may be water cooled in a manner well known in the art and not necessary to illustrate. The furnace 3 is provided at its top with a feed hopper 6 and locks 7 and 8 for charging the admixture of metal oxide and carbonaceous material into the furnace. As shown, the shaft furnace tapers outwardly throughout most of its length and tapers inwardly at its lower portion. It is provided at its lower end with locks 9 through which the spent charge can be withdrawn as required.

The shaft furnace 3 is provided with a plurality of tuyères 10 for the admission of methane or natural gas from a gas pump 11, a pipe 12 and a valve 13. A circular manifold 14 is preferably provided with short pipes 15 extending radially inwardly therefrom to each of the tuyères.

The shaft furnace 3 is provided with an outlet stack 16 controlled by a damper type valve 17. Near its lower end the shaft is provided with an inlet flue designated generally by the reference numeral 18 which will be more fully described hereinafter.

A stove for intensely preheating the air blast is designated generally by the reference numeral 19. This stove is also provided with a steel shell 20 and an insulated brick lining 21 as well as brick checkerwork 22. The stove is provided with an outlet stack 23 at its upper end and this stack is controlled by a damper type valve 24. As shown, the flue 18 is connected to the lower part of the stove 19 and communication between the stove and flue is controlled by a valve 25 which should be of any recognized type designed to withstand high temperatures. A pipe 26 extends from the gas pipe 12 to the lower end of the stove 19 and may be used to supply gas to the stove, control being maintained by a valve 27. Branching from the pipe 26 is a pipe 28 leading to the flue 18 between the valve 25 and the furnace 3. Passage of gas through the pipe 28 is controlled by a valve 29.

A large conduit 30 extends from the flue 18 to an oil reservoir 31. This conduit 30 is provided with a valve 32. The inlet of the conduit 30 into the oil reservoir 31 is preferably provided with a deflector 33. An oil, such as kerosene, should be maintained at approximately the level 34 in the oil reservoir 31. A pump 35 pumps oil from the oil reservoir 31 through the pipe 36 into a pipe 37 provided with cooling fins 38 to a spray head or rose 39 near the junction of the conduit 30 with the flue 18. The discharge of oil through the spray head 39 is controlled by a valve 40 in the pipe 38.

A large pipe 41 affords communication between the oil reservoir 31 and the stove 19 and this communication is controlled by means of a valve 42.

An air pump 43 discharges air into a pipe 44 extending to the stack 23 below the valve 24. The pipe 44 is provided with a valve 45. Branching from the pipe 44 is a pipe 46 provided with a valve 47 which extends through the outlet end of the large pipe 41 into the stove 19.

With the foregoing description of the apparatus its operation in carrying out the process will now be explained. To facilitate description it will be assumed that the "make" period has come to an end and that the admixture of metal oxide and coke in the shaft furnace 3 is at a temperature below that at which substantial reduction of the metal oxide occurs. Also to facilitate description it will be assumed that the shaft furnace 3 is charged with an admixture of magnesium oxide and coke and that the furnace is full of the admixture.

For reasons which will become apparent as the description proceeds, the stove 19 at the end of the "make" period will be highly heated and will be filled with hot products of combustion almost wholly devoid of oxygen. At the end of the "make" period the shaft furnace 3 is filled with the products of reduction of the magnesium oxide. To start the "blast" period the various valves will be set to their positions shown in Fig. 1 and the air pump 43 will pump air through the pipe 44, the valve 45 and the stove 19. As the air blast enters the stove 19, it will force the hot products of combustion through the valve 25 into the flue 18 and on into the shaft furnace 3. In passing through the stove 19 the air blast will be considerably heated by contact with the inner surfaces thereof and the brick checkerwork 22. The heated air blast will then pass through the flue 18 and into the shaft furnace to effect burning of the coke to raise the temperature of the coke and magnesium oxide admixture. The products of combustion of the coke will pass through the open damper type valve 17 and out the stack 16.

It will be noted from Fig. 1 that the valve 29 is open to permit gas to flow into the flue 18. The importance of this arrangement in the reduction of magnesium oxide will now be explained. The reduction of magnesium oxide with methane requires a temperature range of 1600° C. to 2000° C. This temperature is attained primarily by burning of the coke in the admixture but the principal limiting factor in the final temperature is the necessity for heating a large volume of inert nitrogen in the air blast. This makes it vital to give the air entering the shaft furnace as high a temperature as possible. It is possible to preheat the air blast in the stove 19 to a temperature of about 1400° C., but this temperature, which would tend to be that of the flue, would be too low to prevent substantial reoxidation of magnesium vapor by carbon monoxide during the "make" period. It is, therefore, necessary to give the air blast a further increment of heat so that it will produce a higher temperature when it burns the coke in the furnace and also so that the flue 18, through which the magnesium vapors must later pass, will be at a temperature high enough to minimize reoxidation. This is accomplished by the valve 29 admitting a small volume of gas into the flue 18 which gas immediately burns in the air blast and further heats the blast and the inner walls of the flue. The amount of gas so burned is small but its heat is completely utilized. In burning this auxiliary gas, part of the oxygen content of the air blast is used and its oxygen content is reduced from the initial 21% to approximately 16%. The intensely heated air with slightly diminished oxygen content comes into contact with the coke of the charge and burns it. The combustion of the coke probably first produces carbon dioxide but this soon suffers partial reduction to carbon monoxide a few inches above the zone of most intense heat. In any event, the burning of the coke by the highly heated air blast rapidly raises the temperature of the admixture to approximately 2000° C. in that portion of the shaft furnace immediately above the inlet of the flue 18. The products of combustion leaving the shaft furnace through the stack 16 are themselves combustible and may be used for heating purposes.

After the temperature of the admixture in the zone just above the inlet of the flue 18 has reached approximately 2000° C., the valve 25 is slowly closed to gradually discontinue the air blast. During closing of the valve 25 and for a short interval thereafter the valve 29 is left open and gas continues to flow into the flue 18 and to the zone of highest temperature in the shaft furnace. The purpose of this procedure is to purge the flue 18 and the reaction zone in the shaft furnace of air. This purging has a two-fold purpose. First it eliminates oxygen from the flue 18 and also from the reaction zone to prevent reoxidation of magnesium vapor at the beginning of the "make" period. The second purpose is to eliminate nitrogen from the flue 18 and the reaction zone in the furnace. It is known that magnesium vapor will react readily with gaseous nitrogen to form magnesium nitride. The free energy of formation of magnesium nitride is such that magnesium vapor and nitrogen might form an explosive mixture.

After the purging of the flue 18 and the reaction zone in the furnace of oxygen and nitrogen, the apparatus is ready for the "make" period of the process. To begin the "make" period the various valves of the apparatus are set to their positions shown in Fig. 2. The pump 11 forces natural gas through the pipe 12, the open valve 13, the manifold 14, and the pipes 15 through the tuyères into the hot reaction zone in the shaft furnace 3. The natural gas is introduced into the reaction zone in sufficient volume and at sufficient pressure to constitute what I term an "abrupt" introduction. In the case of the reduction of magnesium oxide this "abrupt" introduction is important to prevent thermal decomposition of the methane in the natural gas into carbon and hydrogen which would be relatively ineffective as reducing agents. The natural gas entering the reaction zone abruptly through the tuyères 10 effects reduction of the magnesium oxide, and since the valve 17 in the stack 16 is closed, the gas stream and the magnesium vapors can leave the shaft furnace only through the flue 18 and conduit 30. On entering the conduit 30, the products of reduction contact a spray of relatively cold oil issuing from the spray head 39 and the magnesium vapor is condensed. If desired, the conduit 30 and the oil cooling pipe 37 may be cooled by a water spray on their outer surfaces to condense oil vapors and to thoroughly cool condensed metal and liquids. The rate of flow of the products of reduction leaving the reaction zone and the temperature in the flue 18 are such that they prevent any significant reoxidation of the magnesium vapor by the carbon monoxide. The large amount of hydrogen in the reaction gases also hinders reoxidation of the magnesium. The condensed magnesium and the other products of reduction (largely carbon monoxide and hydrogen) continue on through the conduit 30 and into the oil reservoir 31. The condensed magnesium settles in the oil in the reservoir and may be withdrawn from time to time through the valve 48. This condensed magnesium may be subjected to distillation to remove the oil therefrom and to recover the magnesium in massive form. The carbon monoxide and hydrogen leave the oil reservoir through the large pipe 41 and enter the stove 19 where they are burned with air entering the stove through the pipe 46 to effectively reheat the stove.

In the event that the burning of the carbon monoxide and hydrogen entering the stove through the pipe 41 is insufficient to raise the temperature of the tsove to the desired value, additional natural gas may be supplied through the pipe 26 and burned in the stove 19 along with the carbon monoxide and hydrogen. The products of this combustion pass from the stove through the stack 23.

The "make" period is continued until the temperature in the reaction zone reaches a value at which substantial reduction of the magnesium oxide ceases. The various valves in the apparatus are then returned to their positions shown in Fig. 1, and the "blast" period is repeated. The valves may be automatically controlled and synchronized by solenoids actuated by contacts on a rotating drum such as the controls on a water gas machine and on other machines well known in the art.

The material charged into the shaft furnace 3 through the hopper 6 is preferably the oxide of the metal mixed with coke particles. The size of the solid pieces should be such as to permit ready passage of gases through the charge. If powdered oxide is to be used, it should be briquetted with pitch and the coke. The charge will gradually work downwardly and ash or residue is withdrawn from time to time through the lock 9 and fresh charge is introduced into the furnace from the feed hopper 6.

The ratio of coke to metal oxide in the charge should be such that some unburned coke will remain in the material leaving through the locks 9. This is advisable to prevent any unreacted oxygen being present in the lower part of the furnace 3, the presence of which would create an explosion hazard when the reducing gas is turned on at the beginning of the "make" period.

In the foregoing detailed description I have referred for the most part to the reduction of magnesium oxide. My process is also advantageous in the reduction of the oxides of other metals which are vapors at their reduction temperatures. By a slight modification and simplification of the process, it is highly advantageous in the reduction of zinc oxide.

Carbon monoxide or hydrogen could be used to reduce zinc oxide whereas they are ineffective with magnesium oxide. However, I have found that it is preferable to use methane since the reduction occurs more readily and at much lower temperatures. When using methane or natural gas, a temperature range of 1000° to 1200° C. suffices for zinc oxide. After reduction the zinc also leaves the reaction zone as a vapor, but it is less readily reoxidized by carbon monoxide and the reduction reaction is not so strongly endothermic as is the case with magnesium oxide. Thermal decomposition of the methane is much less of a problem at the reduction temperature of zinc oxide and, if desired, the natural gas may be introduced into the shaft furnace at the uper end thereof through the pipe 12 and the valve 49. Any cadmium present in the ore will be evolved and condensed with the zinc and can be recovered separately in a subsequent distillation of the metal.

While for the purposes of illustration I have described my invention with certain particularity, it is distinctly understood that the invention is not specifically limited to this description except as restricted by the following claims.

Having thus described the invention, what is claimed as new is:

1. A process for reducing an oxide of a metal which is a vapor at the reduction temperature, which process comprises admixing the metal oxide with solid carbonaceous material, introducing the admixture into a reaction zone, passing a heated air blast through the admixture to oxidize sufficient of said carbonaceous material to raise the temperature of the admixture above the reduction temperature of the metal oxide, purging the reaction zone of air, introducing a blast of gaseous hydrocarbon into the admixture to effect reduction of the metal oxide and separation of the metal vapor from the admixture, and continuing the gaseous hydrocarbon blast while condensing the metal vapor until the temperature of the admixture has fallen below that of substantial reduction of the metal oxide.

2. A process for recovery of metallic magnesium which process comprises admixing magnesium oxide with coke, introducing the admixture into a reaction zone, passing a heated air blast through the admixture to burn sufficient of said coke to raise the temperature of the admixture substantially above 1600° C., discontinuing the air blast, purging the reaction zone of air, introducing a blast of methane gas into the admixture to effect reduction of the magnesium oxide and separation of magnesium vapor from the admixture, and continuing the methane gas blast while condensing the magnesium vapor until the temperature of the admixture has fallen below that at which substantial reduction of the magnesium oxide occurs.

3. A process for recovery of metallic zinc by reducing zinc oxide which process comprises admixing the zinc oxide with solid carbonaceous material, introducing the admixture into a reaction zone, passing a blast of heated air through the admixture to oxidize sufficient of said carbonaceous material to raise the temperature of the admixture substantially above 1000° C., discontinuing the air blast, introducing a blast of gaseous hydrocarbon into the admixture to effect reduction of the zinc oxide and separation of zinc vapor from the admixture, and continuing the gaseous hydrocarbon blast while condensing the zinc vapor until the temperature of the admixture has fallen below approximately 1000° C.

4. A process for reducing an oxide of a metal which is a vapor at the reducing temperature, which process comprises admixing the metal oxide with solid carbonaceous material, introducing the admixture into a reaction zone, passing a heated air blast in one direction through the admixture to burn sufficient of said carbonaceous material to raise the temperature of the admixture above the reduction temperature of the metal oxide, discontinuing the air blast, passing a blast of natural gas through the admixture in a direction opposite to that of said air blast to effect reduction of the metal oxide and separation of the metal vapor from the admixture while maintaining the temperature of the metal vapor above that temperature at which it will reoxidize in the presence of the other products of the reduction, condensing and recovering the metal vapor, and continuing the blast of natural gas until the temperature of the admixture has fallen below that of substantial reduction of the metal oxide.

5. A process for recovery of metallic magnesium by reducing magnesium oxide which process comprises admixing magnesium oxide with solid carbonaceous material, introducing the admixture into a reaction zone, passing a highly heated air blast in one direction through the admixture to burn sufficient of the carbonaceous material to raise the temperature of the admixture substantially above 1600° C., discontinuing the air blast, purging the reaction zone of oxygen and nitrogen, passing a blast of natural gas through the admixture in a direction opposite to that of said air blast to effect reduction of the magnesium oxide and separation of magnesium vapor and gaseous products of reduction from the admixture at a temperature at which the magnesium vapor is not reoxidized by the gaseous products of reduction, suddenly condensing the magnesium vapor, and continuing the blast of natural gas until the temperature of the admixture has fallen below that of substantial reduction of the magnesium oxide.

6. A process for recovery of metallic zinc by reduction of zinc oxide which process comprises admixing zinc oxide with solid carbonaceous material, introducing the admixture into a reaction zone, passing a heated air blast in one direction through the admixture to burn sufficient of said carbonaceous material to raise the temperature of the admixture substantially above 1000° C., discontinuing the air blast, passing a blast of natural gas through the admixture in a direction opposite to that of said air blast to effect reduction of the zinc oxide and separation of zinc vapor and gaseous products of reduction from the admixture at a temperature at which the zinc vapor is not reoxidized by the gaseous products of reduction, condensing and recovering the zinc vapor, and continuing the blast of natural gas until the temperature of the admixture has fallen below that at which substantial reduction of the zinc oxide occurs.

EDMUND S. MERRIAM.